(12) United States Patent
Shigeta et al.

(10) Patent No.: US 7,513,328 B2
(45) Date of Patent: Apr. 7, 2009

(54) COWLING OF MOTORCYCLE (75) Inventors: Yasuhiro Shigeta, Hamamatsu (JP); Koji Yoshiura, Frankfurt am Main (DE)

(73) Assignee: Suzuki Kabushiki Kaisha, Hamamatsu-Shi (JP)

( * ) Notice: Subject to any disclaimer, the term of this patent is extended or adjusted under 35 U.S.C. 154(b) by 235 days.

(21) Appl. No.: 11/517,250

(22) Filed: Sep. 8, 2006

(65) Prior Publication Data
US 2007/0056790 A1 Mar. 15, 2007

(30) Foreign Application Priority Data
Sep. 12, 2005 (JP) .............................. 2005-264261

(51) Int. Cl.
B62D 61/02 (2006.01)
(52) U.S. Cl. ...................................... 180/225; 280/782
(58) Field of Classification Search ................. 180/225; 280/782; 293/106
See application file for complete search history.

(56) References Cited
U.S. PATENT DOCUMENTS

| 7,318,497 B2 * | 1/2008 | Okunosono | 181/227 |
| 7,320,378 B2 * | 1/2008 | Inaoka et al. | 180/225 |
| 7,360,620 B2 * | 4/2008 | Takenaka et al. | 180/291 |
| 7,380,624 B2 * | 6/2008 | Momosaki | 180/68.3 |

* cited by examiner

Primary Examiner—Paul N Dickson
Assistant Examiner—Tashiana Adams
(74) Attorney, Agent, or Firm—Oblon, Spivak, McClelland, Maier & Neustadt, P.C.

(57) ABSTRACT

A motorcycle includes an exhaust device connected to an engine unit, and the exhaust device includes: a plurality of first exhaust pipes forwardly extending from an exhaust port which opens in the front of the engine unit; a joint portion for joining the first exhaust pipes; a second exhaust pipe connected to a downstream side of the joint portion and passing below an oil pan disposed in a lower portion of the engine unit; and an exhaust expansion chamber connected to a downstream portion of the second exhaust pipe. A cowling of such a motorcycle includes: a front cowling covering the engine unit and the exhaust device from lower and side portions thereof; and a rear cowling partially covering a rider's seat. The front cowling is formed with an air-exhaust opening at a bottom surface of a rear end thereof positioned to a front lower surface of the exhaust expansion chamber.

5 Claims, 7 Drawing Sheets

COWLING OF MOTORCYCLE

BACKGROUND OF THE INVENTION

1. Field of the Invention

The present invention relates to a cowling of a motorcycle.

2. Description of the Related Art

There is known a motorcycle in which an engine unit is mounted on a central front lower part of a motorcycle body, and the engine unit and an exhaust expansion chamber constituting an exhaust device connected to the engine unit are covered with a cowling (see, for example, Japanese Patent No. 3046435 and Japanese Unexamined Patent Application Publication No. 2002-302082).

Another motorcycle is also known in which a plurality of exhaust pipes for guiding exhaust gas to an exhaust expansion chamber is connected to a multi-cylinder engine unit, an exhaust joint portion for joining the exhaust pipes is disposed in the exhaust pipes, and an exhaust throttle valve for varying the cross-sectional area of an exhaust path and an oxygen sensor for measuring the oxygen content in the exhaust gas are disposed between the exhaust joint portion and the exhaust expansion chamber.

However, when the exhaust expansion chamber is disposed at the rear portion of the exhaust throttle valve and the oxygen sensor, and the surrounding areas of these components are covered with a cowling, hot air heated by the exhaust pipes remains in the surrounding areas of the exhaust throttle valve and the oxygen sensor. In particular, the rear portion of the cowling is shaped so as to be blocked by the exhaust expansion chamber, and it is hence difficult for the hot air to come out of the cowling well. In addition, since an oil pan for storing high-temperature lubricating oil is disposed above the exhaust throttle valve and the oxygen sensor, the ambient temperature becomes high, which is inconvenient.

Therefore, since the temperature of the surrounding areas of the exhaust throttle valve and the oxygen sensor becomes significantly high, there is a fear of deteriorating the durability and reliability of these devices.

SUMMARY OF THE INVENTION

Accordingly, the present invention was conceived in consideration of the circumstances mentioned and it is an object of the present invention to provide a motorcycle cowling capable of efficiently expelling hot air from inside the cowling.

The above and other objects can be achieved according to the present invention by providing a cowling of a motorcycle including an exhaust device connected to an engine unit, the exhaust device including: a plurality of first exhaust pipes forwardly extending from an exhaust port opened to a front side of the engine unit disposed below a central portion of a motorcycle frame; a joint portion for joining the first exhaust pipes; a second exhaust pipe connected to a downstream side of the joint portion and passing below an oil pan disposed in a lower portion of the engine unit; and an exhaust expansion chamber connected to a downstream portion of the second exhaust pipe, disposed below a rear-wheel suspension disposed at a rear side of the engine unit viewed from a side of the motorcycle, and extending in a lateral direction of the motorcycle body, the cowling of the motorcycle comprising:

a front cowling covering the engine unit and the exhaust device from lower and side portions thereof; and a rear cowling partially covering a rider's seat, wherein the front cowling is formed with an air-exhaust opening at a bottom surface of a rear end thereof positioned to a front lower surface of the exhaust expansion chamber.

In a preferred embodiment of the above aspect, the front cowling may have a cutout portion at a rear portion thereof so as to expose at least a bottom surface and a lower half of a side surface of the exhaust expansion chamber, the cutout portion being substantially flush with an exterior of the exhaust expansion chamber.

The exhaust device may include an exhaust throttle valve and an oxygen sensor disposed on the second exhaust pipe connecting the joint portion and the exhaust expansion chamber together, and the front cowling covers surroundings of the exhaust throttle valve and the oxygen sensor.

The front cowling may include an upper cowling section covering the front upper portion of the motorcycle body from the front side and an under cowling section covering both sides of the engine unit through the lower portion thereof from the lower portion of the upper cowling. The under cowling section may include lateral side cowls and a heat resistant sheet is disposed on an inner side of the side cowls at an area facing the first exhaust pipes so that a clearance remains between the inner side of the side cowl and the heat resistant sheet.

The front cowling may have a streamlined shape and made of resin.

According to the cowling of a motorcycle of the present invention of the structure mentioned above, hot air from inside the cowling can be effectively ventilated, and the exhaust expansion chamber can be formed with an increased size. In addition, the cowling of the motorcycle can improve the durability and reliability of an exhaust throttle valve and an oxygen sensor.

The nature and further characteristic features will be made more clear from the following descriptions made with reference to the accompanying drawings.

DESCRIPTION OF THE PREFERRED EMBODIMENTS

A preferred embodiment of the present invention will be described hereunder with reference to the accompanying drawings. Further, it is to be noted that the terms "upper", "lower", "right", "left" and the like terms are used herein with reference to the illustrations of the drawings or in a usual standing state of the motorcycle.

Figure 1:
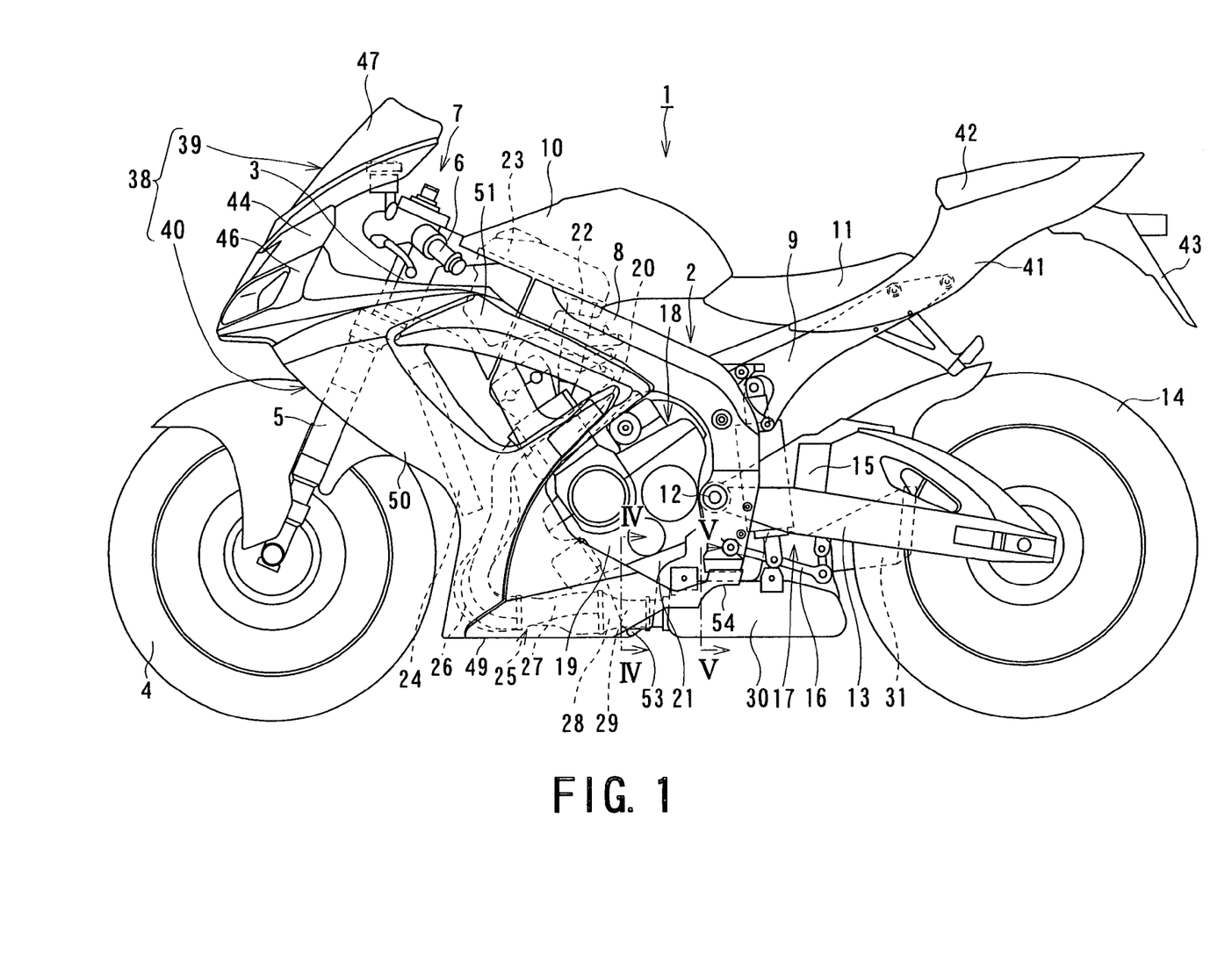
FIG. 1 is a left side view of a motorcycle provided with a cowling according to an embodiment of the present invention.

With reference to FIG. 1, a motorcycle 1 includes a body frame 2 and a head pipe 3 disposed in front of the body frame 2. The head pipe 3 includes a front cushion unit, not shown, incorporated therein and is provided with a steering mechanism 7 including a pair of right and left front forks 5 for rotatably supporting a front wheel 4 and handle bars 6. The motorcycle 1 is steered such that the front wheel 4 can be turned to the right and left by means of the handle bars 6.

The body frame 2 can be formed as a twin-tube frame, for example. The body frame 2 includes the head pipe 3, a pair of right and left main frames 8, and a pair of right and left seat rails 9. The main frames 8 are distended in the right and left directions at the rear portion of the head pipe 3, then extend backward downwardly in an oblique direction in parallel with each other, and downwardly extend in the rear direction. The seat rails 9 are mounted to a rear curved portion of the main frames 8 and extend toward in a rear direction.

A fuel tank 10 is disposed above the forward portion of the main frames 8, and a driver's seat 11 is removably disposed above the seat rails 9. Pivot portions 12 are disposed adjacent to the rear ends of the main frames 8. The front end of a swing arm 13 is mounted between the pivot portions 12 so as to be swingable, and a rear wheel 14 is rotatably supported at the rear end of the swing arm 13 by means of a shaft. The base end of the swing arm 13 is supported by the body frame 2 via a rear cushion unit 15 and a link member 16 so that the swing arm 13 is cushioned and moved vertically. The swing arm 13, the rear cushion unit 15, and the link member 16 constitute a rear-wheel suspension 17.

Figure 2:
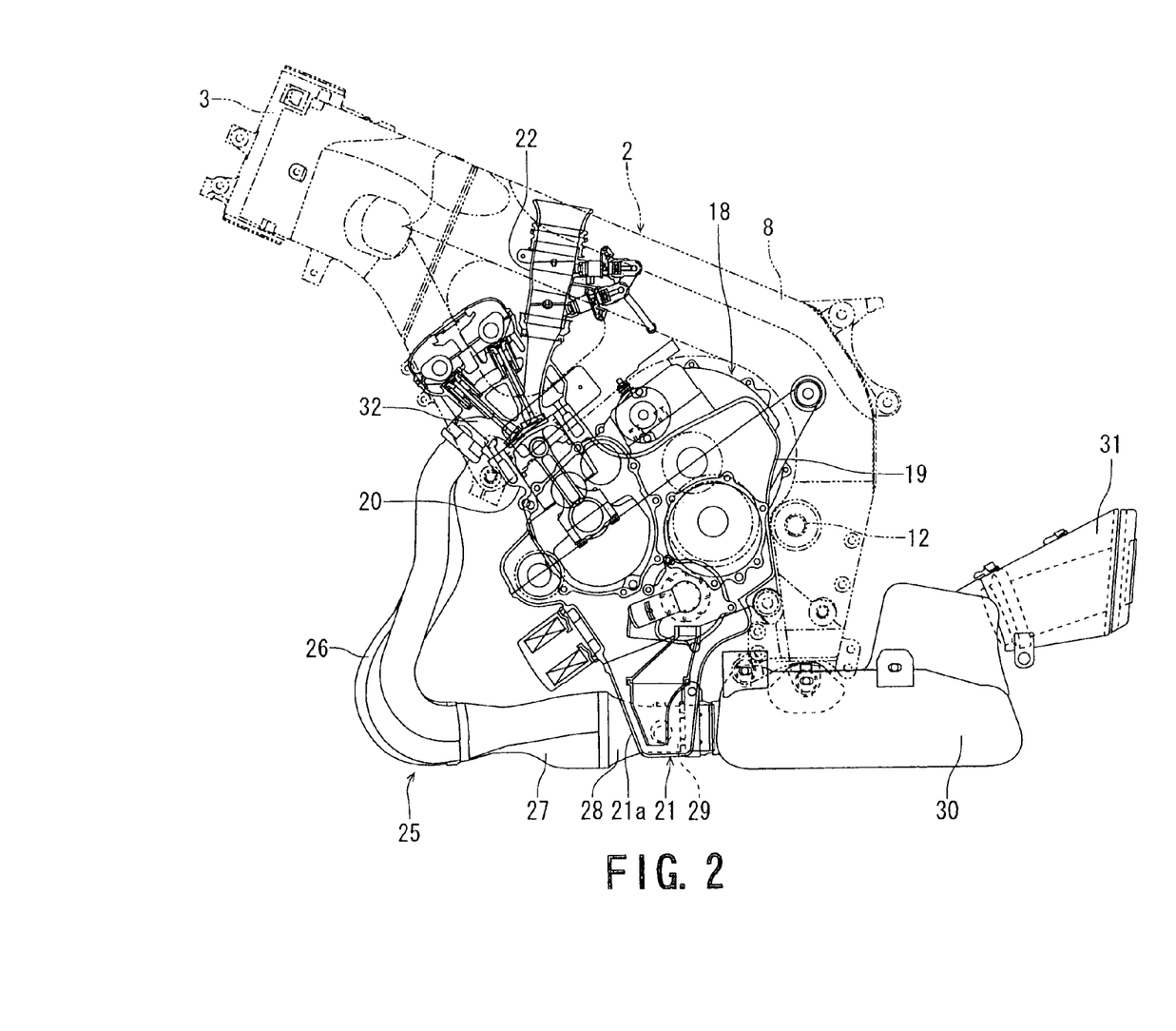
FIG. 2 is a longitudinal sectional view of an engine unit of the motorcycle.

An engine unit 18 is mounted under the main frames 8 in the central portion of the motorcycle body and below the fuel tank 10. FIG. 2 is a longitudinal sectional view of the engine unit 18. As illustrated in FIG. 2, the engine unit 18 is formed as a four-cylinder in-line four-stroke water-cooled engine, for example. The engine unit 18 includes an engine case 19, a cylinder assembly 20 disposed at the front upper portion thereof so as to lean forward, and an oil pan 21 is disposed under the engine case 19.

A unit constituting an intake system (e.g., a throttle body 22) is connected to the rear portion of the cylinder assembly 20 so as to extend substantially upward, and an air cleaner 23 is disposed on the upstream side of the throttle body 22. In addition, a radiator 24 is disposed in front of the engine unit 18 as shown in FIG. 1.

The engine unit 18 is equipped with an exhaust device 25.

Figure 3:
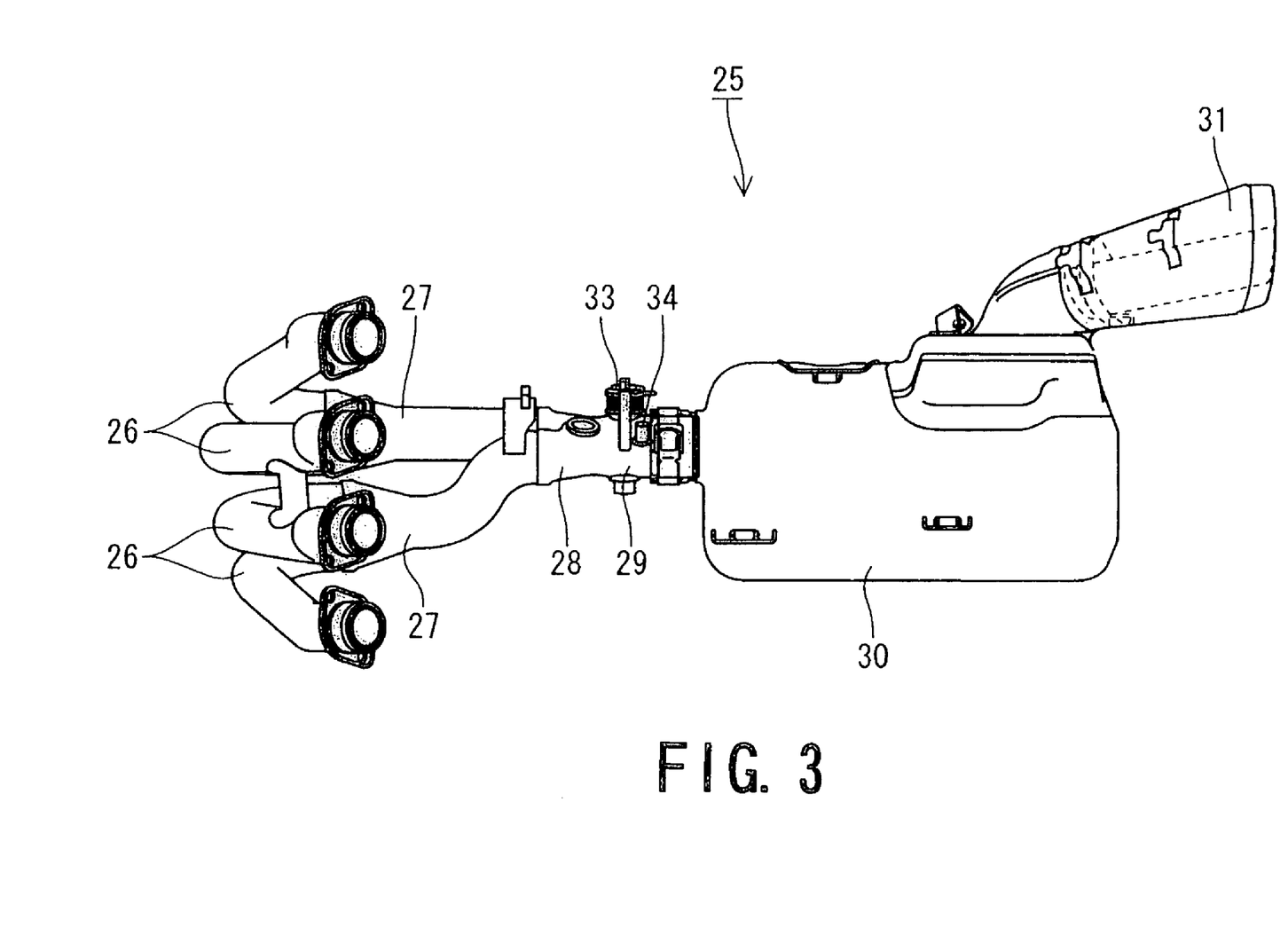
FIG. 3 is a plan view of an exhaust device of the motorcycle.

As illustrated in FIGS. 2 and 3, the exhaust device 25 includes a plurality of first exhaust pipes 26 (in the illustrated embodiment, four pipes, which correspond to the number of cylinders of the cylinder assembly 20), first joint portions 27, a second joint portion 28, a second exhaust pipe 29, an exhaust expansion chamber 30, and an exhaust outlet 31.

The first exhaust pipes 26 extend forward downwardly in an oblique direction from an exhaust port 32 which opens in the front portion of the cylinder assembly 20, extend downwardly, and is then curved rearward. The left-side two first exhaust pipes 26 are joined in the left-side first joint portion 27, and the right-side two first exhaust pipes 26 are joined in the right-side first joint portion 27. The tail ends of the right and left first joint portions 27 are joined in the second joint portion 28 below the engine case 19 and in front of the oil pan 21. The downstream side of the second joint portion 28 is connected to the second exhaust pipe 29 below the engine case 19.

Figure 4:
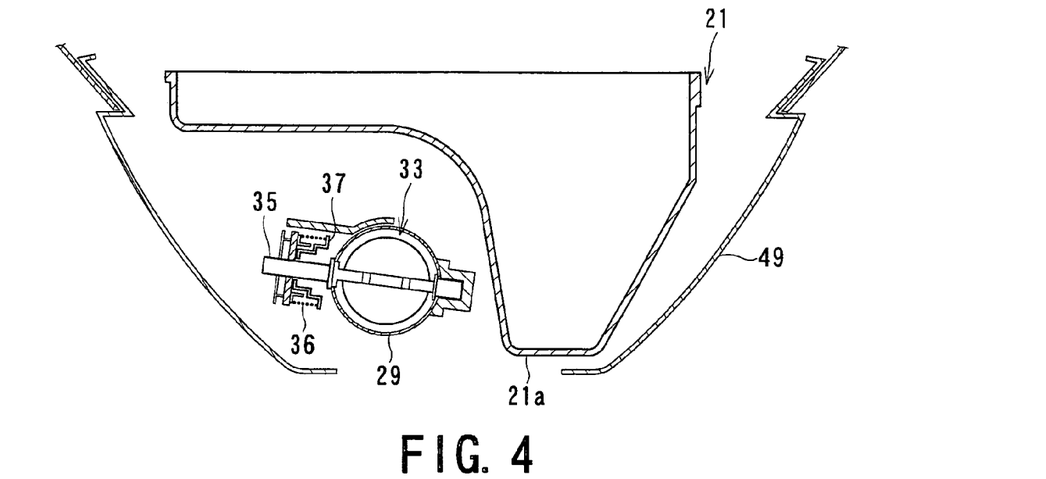
FIG. 4 is a cross-sectional view taken along line IV-IV of FIG. 1.

The second exhaust pipe 29 includes a substantially linear section passing below the engine case 19 (i.e., oil pan 21), and the downstream portion of the second exhaust pipe 29 is connected to the exhaust expansion chamber 30. As illustrated in FIG. 4, the substantially linear section of the second exhaust pipe 29 is disposed so as to be shifted to a first side in the width direction of the motorcycle (e.g., right side) below the oil pan 21 of the engine unit 18. The oil pan 21 includes a lower extending portion 21a extending along a second side in the width direction of the motorcycle (i.e., left side). Therefore, in a right side view of the motorcycle, the substantially linear section of the second exhaust pipe 29 is shown so as to be superimposed on the lower extending portion 21a of the oil pan 21.

In a side view of the motorcycle, the exhaust expansion chamber 30 is disposed at the rear portion of the lower extending portion 21a of the oil pan 21 and below the rear-wheel suspension 17 situated at the rear portion of the engine unit 18 and secured to the motorcycle body.

Figure 5:
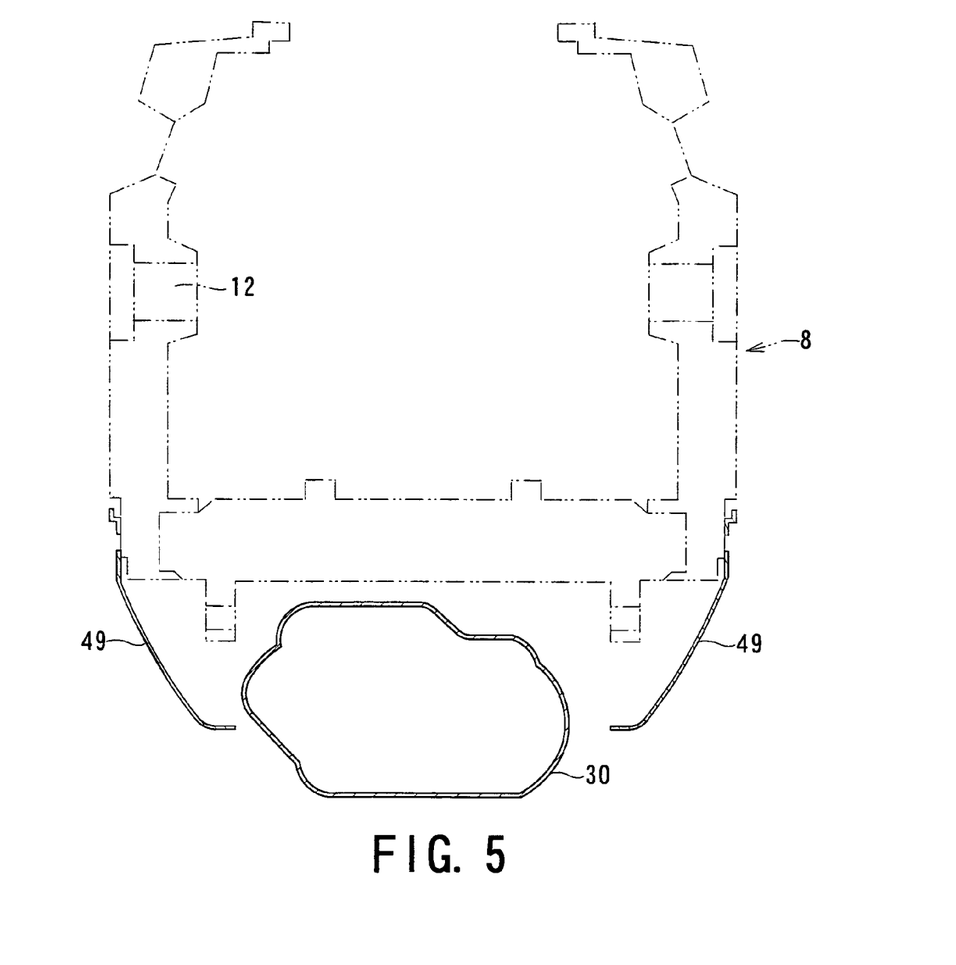
FIG. 5 is a cross-sectional view taken along line V-V of FIG. 1.

As illustrated in FIGS. 3 and 5, the exhaust expansion chamber 30 has a box shape structure extending longitudinally and transversely. The exhaust outlet 31 is coupled to the extreme downstream portion of the exhaust expansion chamber 30.

In a side view of the motorcycle, an exhaust throttle valve 33 and an oxygen sensor 34 are disposed in an area where the substantially linear section of the second exhaust pipe 29 and the lower extending part 21a of the oil pan 21 are overlapped to each other. In the order of the arrangement thereof, the exhaust throttle valve 33 is situated upstream (front side) and the oxygen sensor 34 is situated downstream (rear side).

A valve stem 35 of the exhaust throttle valve 33 is disposed substantially horizontal, and a first end of the valve stem 35 protrudes outwardly. A pulley 37 for winding a cable 36 for driving the exhaust throttle valve 33 is mounted on the first protruding end.

A front half portion of the motorcycle 1 is covered with a streamlined front cowling 38, made of resin, so as to reduce air resistance at a time while the motorcycle 1 is moving and to protect a rider, not shown, from a wind pressure at a time while the motorcycle 1 is moving. The front cowling 38 is formed from a plurality of members, and the major members include an upper cowling section 39 covering the front upper portion of the body from the front side and an under cowling section 40 covering both sides of the engine unit 18 through the lower portion thereof from the lower portion of the upper cowling section 39. From the lower side portion of the driver's seat 11 through the rear portion thereof is covered with a rear cowling 41. On the rear upper portion of the rear cowling 41, a pillion seat 42 is mounted. On the rear lower portion of the rear cowling 41, a rear fender 43 is mounted. Covers such as the front cowling 38 and other cowlings can be molded from a synthetic resin, for example.

Figure 6:
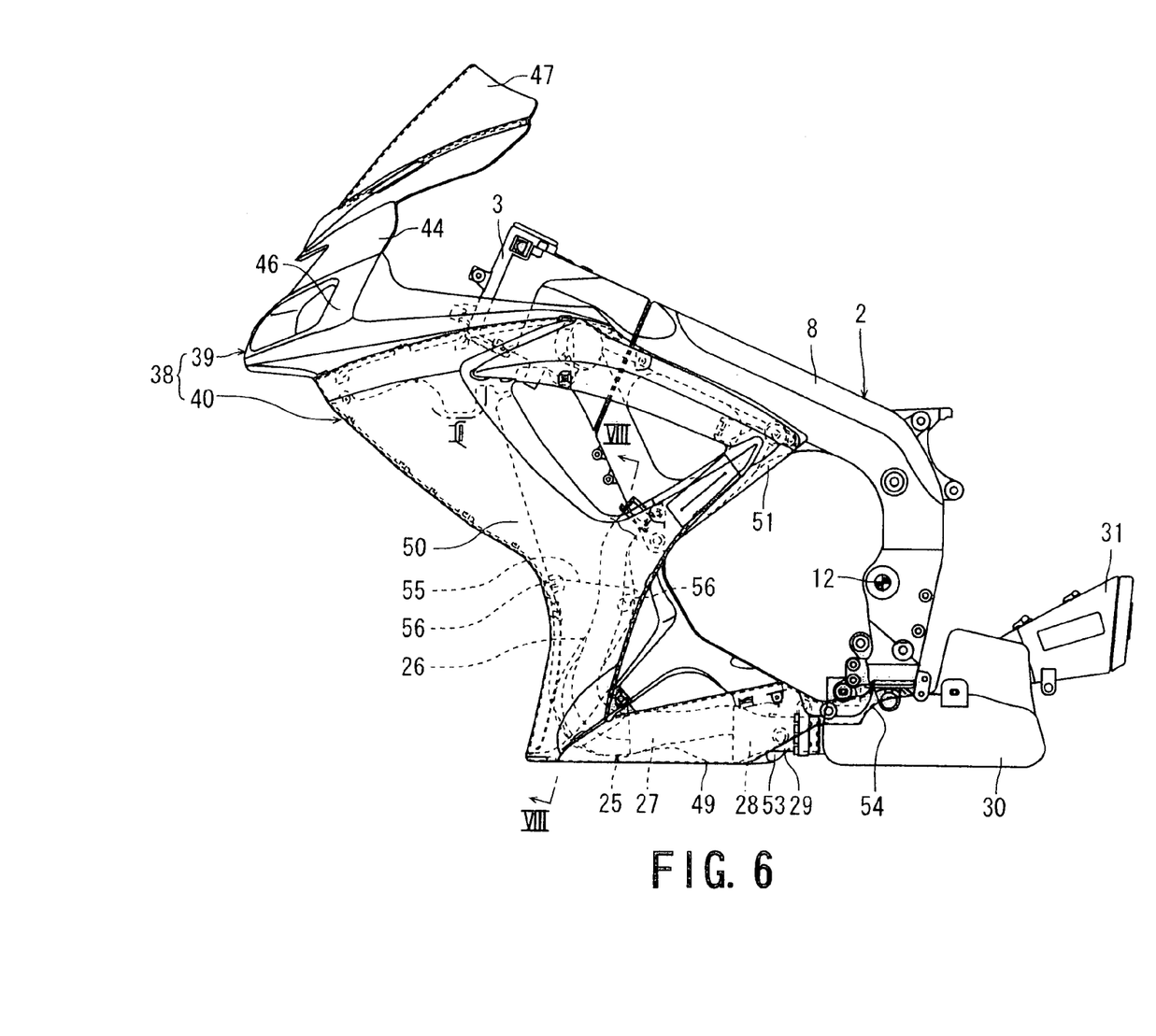
FIG. 6 is a left side view of a body frame and a front cowling of the motorcycle.
Figure 7:
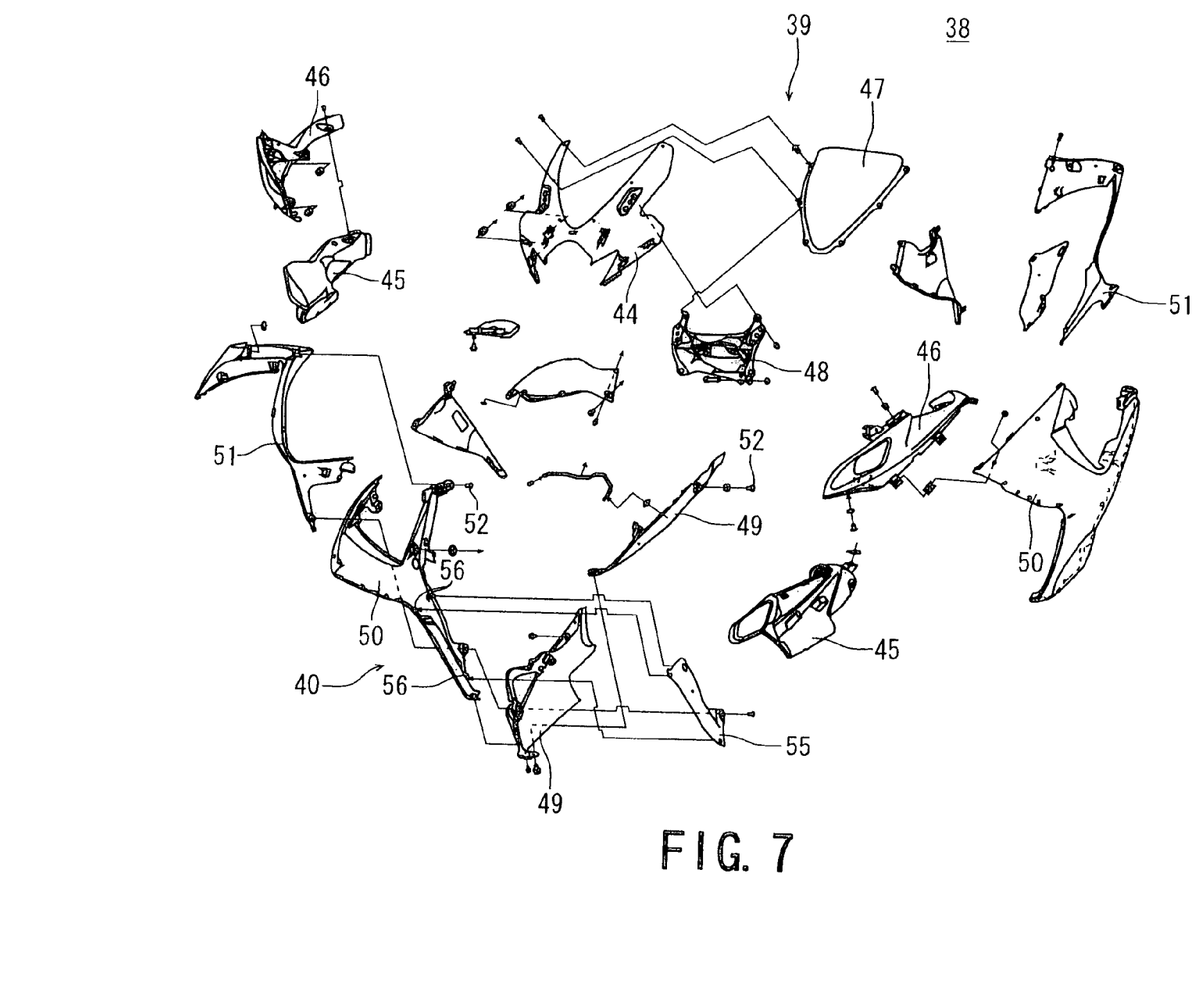
FIG. 7 is an exploded view of an upper cowling and an under cowling of the motorcycle.
Figure 8:
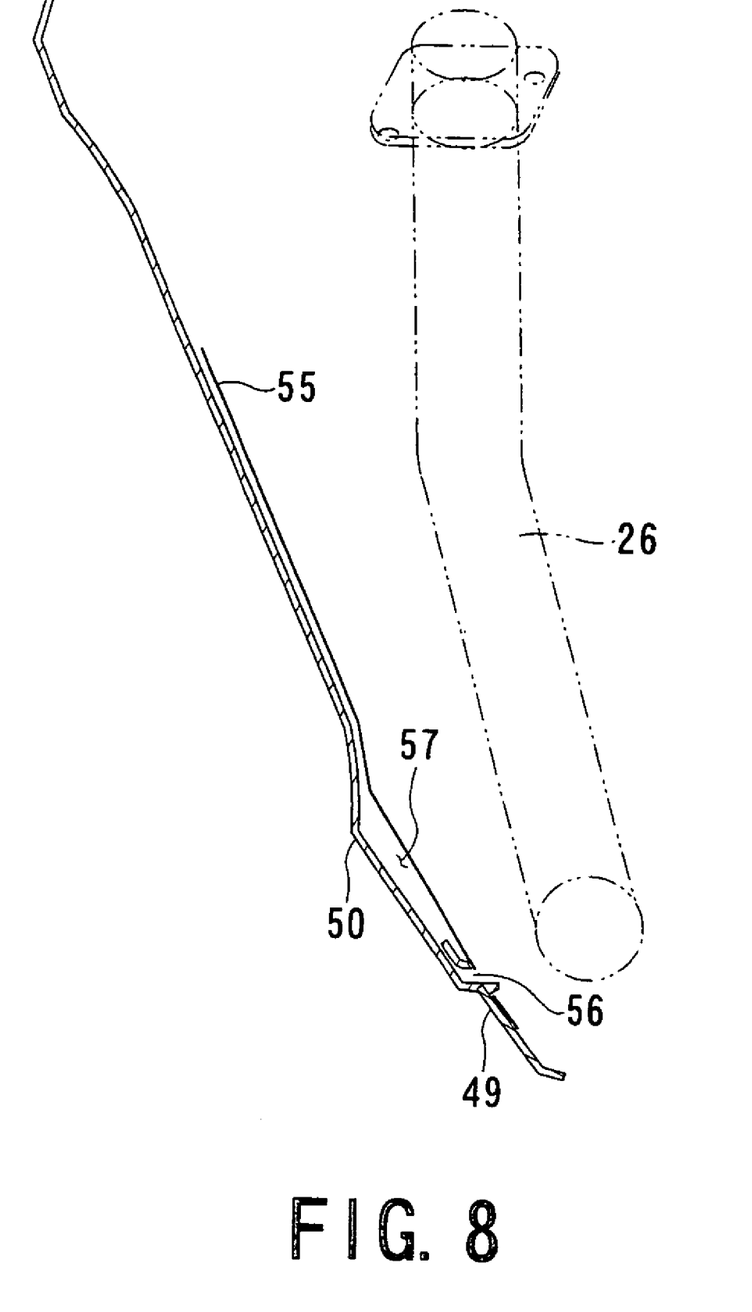
FIG. 8 is a cross-sectional view taken along line VIII-VIII of FIG. 6.

FIG. 6 is a left side view of the body frame 2 and the front cowling 38. FIG. 7 is an exploded view of the upper cowling section 39 and the under cowling section 40. FIG. 8 is a cross-sectional view taken along line VIII-VIII of FIG. 6. As illustrated in FIGS. 6 and 7, the upper cowling section 39 includes a cowl body 44 covering the front of the motorcycle body, a pair of right and left intake covers 46 mounted to both the sides of the cowl body 44 and incorporating intake ducts 45, and a window screen 47 mounted on the upper surface of the cowl body 44. Although not shown in detail, the upper cowling section 39 is mounted to the head pipe 3 via an upper cowl brace 48. The intake ducts 45 serve to guide the wind while the motorcycle 1 is moving to the air cleaner 23.

The under cowling section 40 includes a pair of right and left under cowls 49 disposed in the lowermost position, a pair of right and left side cowls 50 whose lower ends are connected to the front upper portion of the integrated under cowls 49, and a pair of right and left under-cowl covers 51 mounted on the rear portions of the right and left side cowls 50 and also serving as a connecting portion to the body frame 2. These components can be connected to one another via, for example, screws 52, and are integrally assembled, thus constituting the under cowling section 40 which has a substantially U-shaped cross section.

The under cowling section 40 extends from a portion below the intake covers 46 of the upper cowling section 39 to the rear lower ends of the main frames 8 and is mounted on the motorcycle body so as to cover the engine unit 18 and the exhaust device 25 connected to the engine unit 18 from lower and side portions.

An air-exhaust opening 53 is provided to be opened in the rear end of the bottom surface of the under cowls 49 adjacent to a front lower surface of the exhaust expansion chamber 30 included in the exhaust device 25. A cutout portion 54 for exposing at least the bottom surface and the lower half of the side of the exhaust expansion chamber 30 is provided in the rear portions of the under cowls 49. The cutout portion 54 is substantially flush with the exterior of the exhaust expansion chamber 30.

As illustrated in FIGS. 4 and 6, the surroundings of the exhaust throttle valve 33 and the oxygen sensor 34 are covered with the under cowls 49. As illustrated in FIGS. 7 and 8, a heat-resistant sheet 55 is disposed on the inner side of the side cowl 50 at an area facing the first exhaust pipes 26. The heat-resistant sheet 55 is fitted to a plurality of fitting portions 56 protruding from the inner side of the side cowl 50 so that a clearance 57 remains between the inner side of the side cowl 50 and the heat-resistant sheet 55.

The operation of the described embodiment of the present invention will be described below.

The provision of the air-exhaust opening 53 which opens in the rear end of the bottom surface of the under cowls 49 included in the front cowling 38 adjacent to a front lower surface of the exhaust expansion chamber 30 can enable hot air heated by the engine unit 18 and the exhaust device 25 within the front cowling 38 to be sucked by means of negative pressure generated between the air-exhaust opening 53 and a road surface, thus efficiently ventilating air inside the cowling. As a result, the ambient temperature around the exhaust throttle valve 33 and the oxygen sensor 34 can be reduced, and the durability and reliability of these components can be increased.

By partially cutting a portion that covers the surrounding areas of the exhaust expansion chamber 30 in the rear end of the under cowls 49 included in the front cowling 38, the size of the exhaust expansion chamber 30 can be increased by an area corresponding to the cutout portion 54, and the effect of deadening the sound to be increased.

In addition, by covering the surroundings of the exhaust throttle valve 33 and the oxygen sensor 34 with the under cowls 49 included in the front cowling 38, these components can be protected from stones or muddy water splashed by the front wheel 4. As a result, the durability and reliability of these components can be increased. Further, by providing the pulley 37 for winding the cable 36 for driving the exhaust throttle valve 33 so as to face the outside of the body and covering the surrounding areas of the pulley 37 with the under cowls 49, the necessity to have a protective cover (not shown) that was required to protect the pulley 37 can be eliminated. This results in the cost saving and weight reduction.

Moreover, the provision of the heat-resistant sheet 55 disposed on the inner side of the side cowl 50 at an area that faces the first exhaust pipes 26 so that the clearance 57 remains between the inner side of the side cowl 50 and the heat-resistant sheet 55 can form an air layer between the inner side of the side cowl 50 and the heat-resistant sheet 55, and the air layer produces a flow of wind while the motorcycle is moving. As a result, the heat-resistant sheet 55 not only blocks heat sent from the exhaust device 25 but also cools the side cowl 50 actively. Therefore, an increase in the surface temperature of the side cowl 50 and degradation in the appearance caused by heat can be reduced.

Furthermore, since the heat-resistant sheet 55 is merely fitted to the plurality of fitting portions 56 protruding from the inner side of the side cowl 50, the easiness in assembly can be enhanced. In addition, it is not necessary to perform preprocessing that was required to attach the heat-resistant sheet 55 to the inner side of the side cowl 50. Therefore, the cost reduction can be achieved.

It is further to be noted that the present invention is not limited to the described embodiment and many other changes and modifications may be made without departing from the scopes of the appended claims.

What is claimed is:

1. A cowling of a motorcycle including an exhaust device connected to an engine unit, the exhaust device including: a plurality of first exhaust pipes forwardly extending from an exhaust port opened to a front side of the engine unit disposed below a central portion of a motorcycle frame; a joint portion for joining the first exhaust pipes; a second exhaust pipe connected to a downstream side of the joint portion and passing below an oil pan disposed in a lower portion of the engine unit; and an exhaust expansion chamber connected to a downstream portion of the second exhaust pipe, disposed below a rear-wheel suspension disposed at a rear side of the engine unit viewed from a side of the motorcycle, and extending in a lateral direction of the motorcycle body, the cowling of the motorcycle comprising:

a front cowling covering the engine unit and the exhaust device from lower and side portions thereof, and a rear cowling partially covering a rider's seat, wherein the front cowling is formed with an air-exhaust opening at a bottom surface of a rear end thereof positioned to a front lower surface of the exhaust expansion chamber, and the exhaust device includes an exhaust throttle valve and an oxygen sensor disposed on the second exhaust pipe connecting the joint portion and the exhaust expansion chamber together, and the front cowling covers surroundings of the exhaust throttle valve and the oxygen sensor, and the oxygen sensor and the exhaust throttle valve are arranged in a vicinity of an air-exhaust opening opened in the rear end bottom surface.

2. The cowling of a motorcycle according to claim 1, wherein the front cowling has a cutout portion at a rear portion thereof so as to expose at least a bottom surface and a lower half of a side surface of the exhaust expansion chamber, the cutout portion being substantially flush with an exterior of the exhaust expansion chamber.

3. The cowling of a motorcycle according to claim 1, wherein the front cowling includes an upper cowling section covering the front upper portion of the motorcycle body from the front side and an under cowling section covering both sides of the engine unit through the lower portion thereof from the lower portion of the upper cowling.

4. The cowling of a motorcycle according to claim 3, wherein the under cowling section includes lateral side cowls and a heat resistant sheet is disposed on an inner side of the side cowls at an area facing the first exhaust pipes so that a clearance remains between the inner side of the side cowl and the heat resistant sheet.

5. The cowling of a motorcycle according to claim 1, wherein the front cowling having a streamlined shape and made of resin.

* * * * *